United States Patent [19]
Koide

[11] Patent Number: 6,079,736
[45] Date of Patent: Jun. 27, 2000

[54] STEERING WHEEL

[75] Inventor: Teruhiko Koide, Aichi-ken, Japan

[73] Assignee: Kabushiki Kaisha Tokai-Rika-Denki Seisakusho, Aichi-ken, Japan

[21] Appl. No.: 08/927,037

[22] Filed: Sep. 10, 1997

[30]     Foreign Application Priority Data

Sep. 17, 1996   [JP]   Japan ..................................... 8-244941

[51] Int. Cl.⁷ ................................................. B60R 21/16
[52] U.S. Cl. ....................................... 280/731; 280/728.2
[58] Field of Search ................................ 280/731, 728.2, 280/750; 74/552

[56]             References Cited

U.S. PATENT DOCUMENTS

| | | | |
|---|---|---|---|
| 5,150,920 | 9/1992 | Fujita et al. . | |
| 5,356,178 | 10/1994 | Numata | ................................... 280/777 |
| 5,383,682 | 1/1995 | Nagata et al. | ........................... 280/777 |
| 5,720,494 | 2/1998 | Hosoi et al. | ............................. 280/731 |
| 5,794,968 | 8/1998 | Yamamoto et al. | .................... 280/731 |
| 5,826,901 | 10/1998 | Adomeit | ................................ 280/728.2 |

FOREIGN PATENT DOCUMENTS

| | | |
|---|---|---|
| 691 06 244 T2 | 5/1995 | Germany . |
| 196 16 977 C1 | 4/1997 | Germany . |
| WO/ 97/41006 | 11/1997 | WIPO . |

*Primary Examiner*—Brian L. Johnson
*Assistant Examiner*—Faye M. Fleming
*Attorney, Agent, or Firm*—Nixon Peabody LLP; Thomas W. Cole

[57]             ABSTRACT

A steering wheel which has a ring shaped rim and is connected to a steering shaft of a vehicle via a hub, comprising a supporting member which is formed independently of the rim and the hub, is connected to the rim for supporting the same from inside, and can deform by a load at a predetermined value or more from the vehicle occupant side of the vehicle. Accordingly, in the steering wheel, when kinetic energy from the body of the vehicle occupant due to inertia at the time of a rapid deceleration of the vehicle acts on the steering wheel, and presses the rim of the steering wheel by a pressing force (a load) at a predetermined value or more, the supporting member for supporting the rim from inside thereby deforms. As a result, kinetic energy of the body of the vehicle occupant due to inertia at the time of the rapid deceleration of the vehicle can be absorbed.

15 Claims, 2 Drawing Sheets

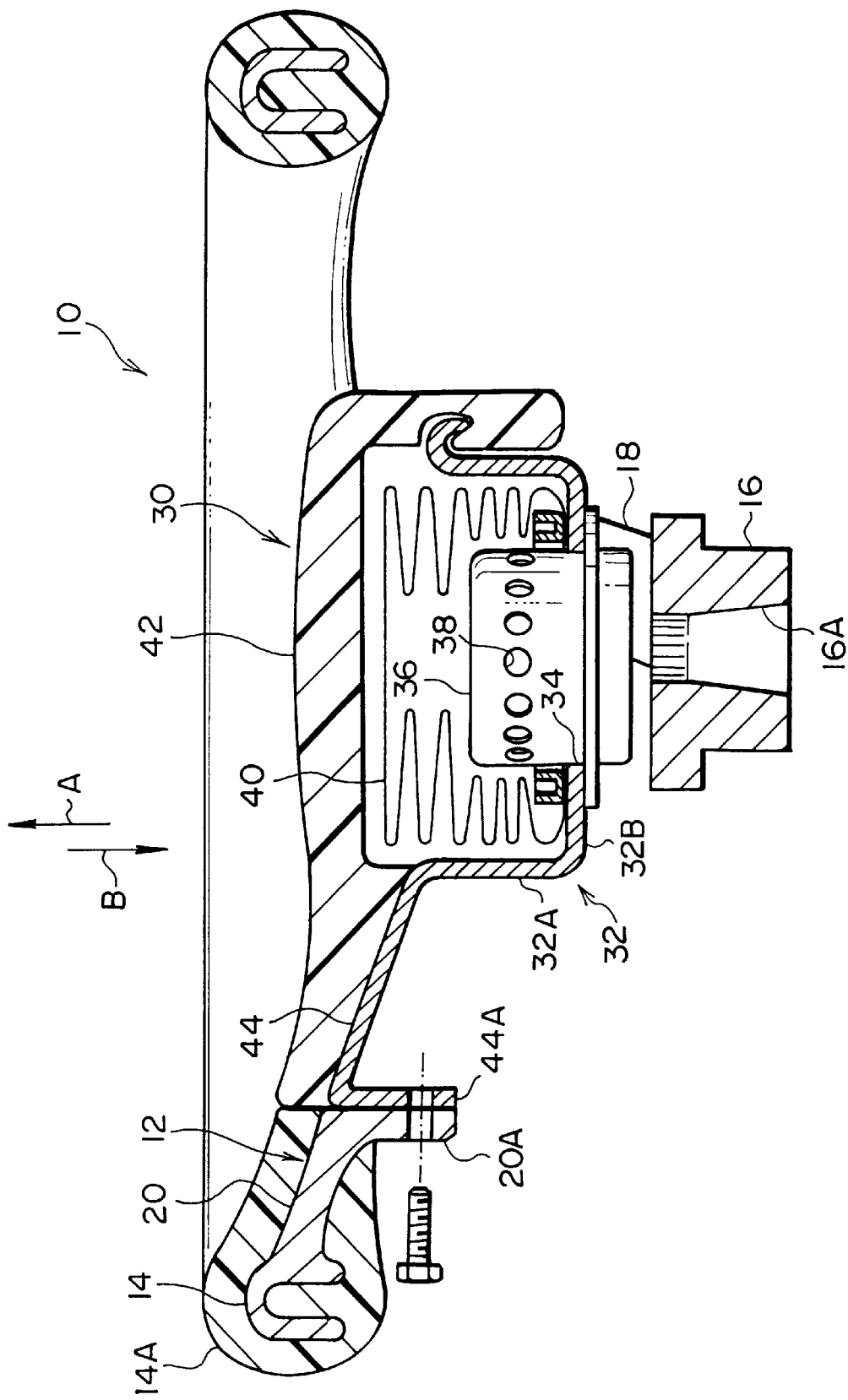

STEERING WHEEL

BACKGROUND OF THE INVENTION

1. Field of the Invention

The present invention relates to a steering wheel used for a steering apparatus of a vehicle.

2. Description of the Related Art

Generally, in the core bar of a steering wheel for a vehicle, a ring shaped hub, a rim mounted to a steering shaft, and a spoke connecting the hub and the rim to each other are integrally molded with each other by casting using metal materials such as alloy including magnesium or aluminum and the like.

Further, in a steering wheel (especially in a steering wheel having three spokes), rigidity (strength) at portions of the spokes corresponding to the abdomen of a vehicle occupant seated on a driver's seat is set and the spokes are deformed by a load at a predetermined value or more from the vehicle occupant side. Accordingly, for example, in a case in which the body of the vehicle occupant has moved and pressed the steering wheel due to inertia at the time of a rapid deceleration of a vehicle, the spokes are deformed in association with the rim so as to absorb kinetic energy from the moving body of the vehicle occupant.

Moreover, the setting of strength of spokes described above is effected even in a case in which an air bag apparatus is installed at a steering wheel. Namely, even in a case that the body (i.e., the abdomen) of the vehicle occupant has pressed the steering wheel by a pressing force at a predetermined value or more via the inflated bag body, the spokes are deformed in association with the rim so that kinetic energy from the vehicle occupant is absorbed by the spokes and the inflated bag body.

However, in a case that a steering wheel is integrally molded by casting, because types of dies drawn from a cast mold and the like may restrict the configuration and/or dimension of a spoke and the rigidity of the spoke must be set/determined by considering this restriction, there has been a problem in that freedom in designing a steering wheel is extremely low. Further, during coagulation in casting, because casts are not cooled uniformly, shrinkage during the coagulation may partly be controlled. For this reason, it is difficult to set the strength of a spoke, and at the development stage of the product, a fine tuning must be effected for the configuration and/or thickness of the spoke in order to set the spoke at a predetermined rigidity. In addition, since a cast model for the product or a cast mold must be adjusted for each tuning, there has been a problem in that the manufacturing cost from a development to a quantity production becomes expensive.

SUMMARY OF THE INVENTION

In view of the aforementioned, it is an object of the present invention to provide a steering wheel which can deform and absorb energy and which can be manufactured inexpensively.

In accordance with the first aspect of the present invention, there is provided a steering wheel which has a ring shaped rim and is connected to a steering shaft of a vehicle via a hub, wherein supporting means is formed independently of the rim and the hub, is connected to the rim for supporting the same from inside, and can deform by a load at a predetermined value or more from the vehicle occupant side of the vehicle.

In the steering wheel which is structured as described above, when kinetic energy from the body of the vehicle occupant due to inertia at the time of a rapid deceleration of a vehicle acts on the steering wheel and presses the rim of the steering wheel by a pressing force (i.e., load) at a predetermined value or more, the supporting means for supporting the rim from inside thereby deforms. By this deformation, kinetic energy of the body of the vehicle occupant due to inertia at the time of a rapid deceleration of the vehicle can be absorbed.

In this case, being different from spokes of a conventional steering wheel which are integrally molded with a rim by casting, because the supporting means according to the present invention is formed separately from the rim, it is thereby facilitated to set the rigidity of the supporting means as compared to a conventional steering wheel as a one-piece product which is formed by casting. Accordingly, it is possible to form only the supporting means into a configuration and/or thickness which is suitable for a desired rigidity by using a forming method (e.g., a press forming) by which setting of rigidity can be facilitated. Moreover, owing to the facility of the rigidity setting, a large amount of the development cost can be reduced.

In accordance with the second aspect of the present invention, there is provided a steering wheel according to the first aspect, the supporting means is provided at a bracket of an air bag apparatus which is disposed inwardly of the rim and inflates a bag body toward the vehicle occupant side by detecting a predetermined acceleration value.

In the steering wheel which is structured as described above, since the supporting means is provided at the bracket of the air bag apparatus, the supporting means and the bracket can be formed at the same time. As a result, the steering wheel can be manufactured inexpensively without increasing the number of components and the number of manufacturing processes.

In accordance with the third aspect of the present invention, there is provided a steering wheel for a vehicle, comprising a ring shaped rim, a hub connected to a steering shaft, a spoke connecting the rim and the hub to each other, a deformable portion formed independently of the rim, the hub, and the spoke is connected to the rim for supporting the same, transmits to the hub a load applied to the rim, and can deform when the load applied to the rim becomes equal to or greater than a predetermined value.

In accordance with the present third aspect, when a load at a predetermined value or more is applied to the rim, the deformable portion deforms. As a result, kinetic energy from the body of a vehicle occupant due to inertia at the time of a rapid deceleration of a vehicle can be absorbed.

BRIEF DESCRIPTION OF THE DRAWINGS

FIG. 2 is a cross sectional view of the steering wheel according to the embodiment of the present invention.

DESCRIPTION OF THE EMBODIMENT

Figure 1:
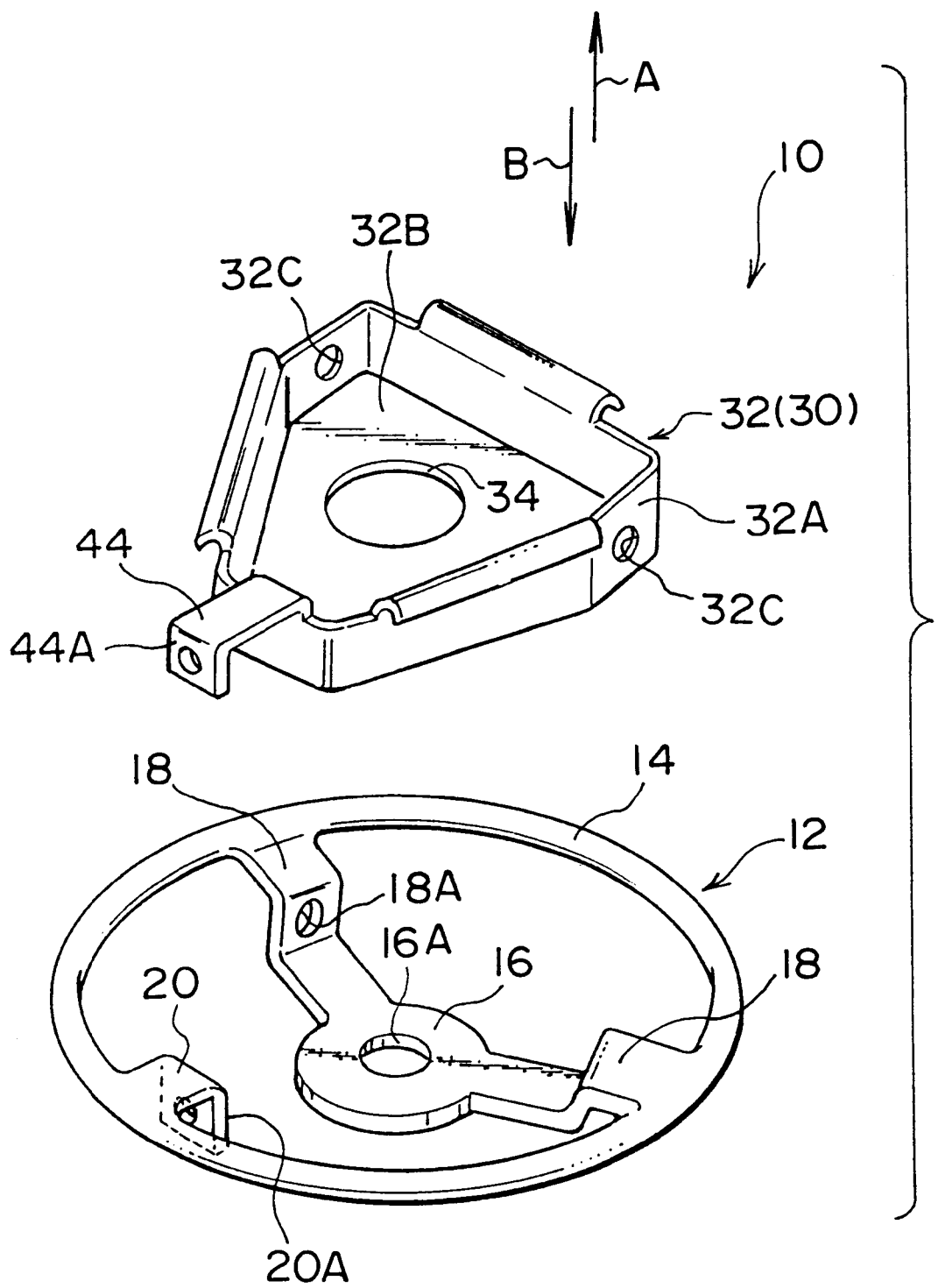
FIG. 1 is an exploded perspective view of a steering wheel according to an embodiment of the present invention.

In FIG. 1, it is shown a perspective view of a steering wheel 10 according to an embodiment of the present invention.

As shown in this figure, the steering wheel 10 has a ring shaped rim 14. As shown in the cross sectional view of the steering wheel 10 in FIG. 2, the cross section of the rim 14 is formed in a U-shape and is opened toward the opposite of a vehicle occupant side (i.e., in a direction indicated by arrow B in FIG. 2), and the periphery of the rim 14 is coated by resin 14A.

A hub 16 is disposed so as to be spaced apart from the center of the surface of the rim 14 at a predetermined distance toward the opposite of the vehicle occupant side in the axial direction of the rim 14 (i.e., in a direction indicated by arrow B in FIGS. 1 and 2). The hub 16 and the rim 14 are connected to each other by a plurality of thin plate shaped spokes 18 (for example, two spokes are provided in the present embodiment) radially extending from the outer peripheral surface of the hub 16. Further, via a through hole 16A, the hub 16 can be mounted to a steering shaft (not shown) of a steering apparatus installed at a vehicle via a through hole 16A.

The rim 14, the hub 16, and the spokes 18 are molded integrally with each other by casting using alloy including magnesium or aluminum.

A mounting portion 20 bent in a L-shape toward the opposite of the vehicle occupant side is disposed so as to extend from inside of the rim 14. When the steering wheel 10 (i.e., the hub 16) is mounted to the steering shaft in a state in which a vehicle advances straight ahead, the mounting portion 20 is structured so as to correspond to the abdomen of a vehicle occupant seated on the driver's seat.

An air bag apparatus 30 is disposed at the vehicle occupant side of the hub 16 of the steering wheel 10 (in a direction indicated by arrow A in FIG. 2). The air bag apparatus 30 has a bracket 32 formed by soft metal such as steel materials, or the like, or synthetic resin, or the like. The bracket 32 is formed in a box shape by press forming, and the air bag apparatus 30 is integrally mounted to the steering wheel 10 by a side wall portion 32A of the bracket 32 being screwed to the spokes 18 through mounting holes 32C, 18A. Moreover, in the present embodiment, the bracket 32 is fixed to the spokes 18. However, the bracket 32 may be fixed to the hub 16.

A circular hole 34 is formed in a bottom wall portion 32B of the bracket 32, and a cylindrical inflator 36 is mounted to the bracket 32 in a state in which the inflator 36 passes through the circular hole 34. Respective members such as an initiator, a detonator, a booster, a gas generator, a filter, and the like (none of them are shown) are accommodated within the inflator 36. In the inflator 36, when the vehicle decelerates rapidly, the initiator is operated by a signal which is transmitted from an acceleration sensor provided in the inflator 36 or an acceleration sensor installed at the vehicle body of the vehicle so as to ignite the detonator, and the gas generator is combusted via the booster so that a large amount of gas is ejected by the inflator 36. Further, the filter serves to cool the gas and remove fragments or the like, and the gas ejects externally from a plurality of gas holes 38 formed at the outer periphery of the inflator 36.

Moreover, at the vehicle occupant side of the inflator 36, a bag body 40 is disposed so as to cover the inflator 36. The opening of the bag body 40 is fixed to the bottom wall portion 32B of the bracket 32. In an ordinary state of the vehicle, the bag body 40 is folded as shown in FIG. 2. However, when the gas ejects from the gas holes 38, the bag body 40 is inflated by the pressure of the gas and expanded toward the vehicle occupant side (i.e., in a direction indicated arrow A in FIG. 2). Further, as shown in FIG. 2, a pad cover 42 made of resin is mounted to the bracket 32 at the vehicle occupant side of the bag body 40. In an ordinary state of the vehicle, the pad cover 42 covers the bag body 40 and the inflator 36 at the vehicle occupant side thereof. Moreover, the pad cover 42 is broken by the pressing force at the time when the bag body 40 inflates and expands and is thereby expandable toward the vehicle occupant side.

Further, a supporting member 44 serving as supporting means which is formed in a thin plate shape and whose distal end portion 44A is bent in a L-shape extends from the bracket 32 of the air bag apparatus 30. The supporting member 44 is molded integrally with the main body portion of the bracket 32 by press forming. The supporting member 44 corresponds to the mounting portion 20 of the rim 14. Accordingly, in a state in which the side wall portion 32A of the bracket 32 is screwed to the spokes 18, the distal end portion 44A of the supporting member 44 corresponds to a distal end portion 20A of the mounting portion 20. As shown in FIG. 2, the supporting member 44 is connected to the rim 14 such that the distal end portion 40A of the supporting member 44 is screwed to the distal end portion 20A of the mounting portion 20. In this case, the supporting member 44 is connected to the spokes 18 via the bracket 32 so as to support the rim 14 from inside.

Moreover, the configuration and/or thickness of the supporting member 44 is set so as to have strength (rigidity) by which the supporting member 44 is deformed in association with the rim 14 when the supporting member 44 is applied by a load at a predetermined value or more from the vehicle occupant side. As a result, the supporting member 44 forms a deformable portion.

Next, an operation of the present embodiment will be explained hereinafter.

In the steering wheel 10 according to the present invention, in a rapid deceleration state of the vehicle, the inflator 36 of the air bag apparatus 30 is operated and a large amount of gas is ejected into the bag body 40. Accordingly, the bag body 40 inflates and expands toward the vehicle occupant side, and due to inertia at the time of the rapid deceleration of the vehicle, the body of the vehicle occupant moving frontward of the vehicle is thereby supported. Further, when the body, especially the abdomen of the vehicle occupant moving frontward due to inertia at the time of the rapid deceleration of the vehicle presses the steering wheel 10 by a pressing force (i.e., load) which is equal to or greater than a predetermined value via the bag body 40 in the inflated state, the supporting member 44 deforms in association with the rim 14. Due to the deformation of the rim 14 and the supporting member 44, kinetic energy from the moving body of the vehicle occupant due to the aforementioned inertia can be absorbed.

Next, the steering wheel 10 according to the present invention is compared to a conventional and so-called 3-spoke steering wheel. In the structure of the conventional steering wheel, because all of a rim, spokes, and a hub are integrally molded with each other by casting, at the development stage of the product, it has been difficult to form a spoke (spokes) corresponding to the abdomen of the vehicle occupant seated on the driver's seat into a configuration suitable for a predetermined rigidity (by which a spoke can deform by a load at a predetermined value or more from the vehicle occupant side). Conversely, in the steering wheel 10 according to the present invention, because the supporting member 44 and the bracket 32 are integrally molded with each other by press forming, being different from the above described conventional steering wheel in which the associated parts are integrally molded by casting, it is possible to provide a steering wheel in which a partial shrinkage control during coagulation in casting (i.e., a tolerance between dimensions of a finished product and a designed product by considering a shrinkage) is not caused. Accordingly, it is thereby facilitated to form the supporting member 44 into a configuration and/or thickness suitable for a predetermined rigidity so that a fine tuning of a cast mold at the development stage of the product is no longer needed. As a result, a large amount of the manufacturing cost at the development stage of the product can be reduced.

In the present embodiment, the supporting member 44 is formed in a thin plate shape. However, the supporting member 44 is not limited to this configuration, and an arbitrary configuration can be adopted as far as it suffices for the above described rigidity (strength). For example, the supporting member 44 can be formed in a narrow width plate shape. Further, a bending portion having continuous irregularities formed in a corrugated shape, or the like can be provided in the radial direction of the rim 14. Moreover, the supporting member 44 can be set at a predetermined rigidity by partially forming a narrow width portion, a through hole, or the like at the supporting member 44 along the longitudinal direction of the supporting member 44 (along the radial direction of the steering wheel 10).

Further, in the present embodiment, it is structured such that the supporting member 44 is disposed merely at a portion corresponding to the abdomen of a vehicle occupant. However, a position at which the supporting member 44 is provided is not limited to the aforementioned portion corresponding to the abdomen of the vehicle occupant. Namely, it can be structured such that the supporting member 44 can be provided in place of the other of the spokes 18 of the steering wheel 10 (two spokes are provided in the present embodiment). Also, it can also structured such that the supporting member 44 is provided in place of the spokes of a so-called 2-spoke steering wheel or a so-called 4-spoke steering wheel.

Moreover, in the present embodiment, it is structured such that the supporting member 44 is provided so as to extend from the bracket 32. However, the supporting member 44 can be formed independently of the bracket 32 so that the supporting member 44 and the bracket 32 are fixed (secured) to each other by fixing means such as screwing, welding, adhesion, or the like.

Further, in the present embodiment, it is structured such that the supporting member 44 as supporting means is provided so as to extend from the bracket 32. However, it can be structured such that, for example, in the same manner as the conventional spokes, only the supporting means is provided as an individual member, and the rim 14 and the hub 16 are connected to each other merely by the supporting mean. In this case, the number of components used increases as compared to that of the conventional steering wheel. However, as far as the supporting means can suffice for a desired or predetermined dimension, it can be applied to other types of steering wheels. As a result, a sufficient availability can be obtained. In this sense, the product can be developed inexpensively.

What is claimed is:

1. A steering wheel comprising:

a ring shaped rim, an integrally formed spoke and hub assembly connected to said rim for mounting said rim to a steering shaft of a vehicle via said hub, and a supporting means formed independently of said rim and said spoke and hub assembly that is connectable to the spokes of said spoke and hub assembly for imparting a desired rigidity to said spokes such that said spokes deform when a load of a predetermined value indicative of an accident condition is applied to said steering wheel.

2. A steering wheel according to claim 1, wherein said supporting means includes a bracket of an air bag apparatus which is disposed inwardly of said rim and which inflates a bag body toward said vehicle occupant side by detecting a predetermined acceleration value.

3. A steering wheel according to claim 1, wherein said supporting means is connected to a spoke connecting said rim and said hub to each other.

4. A steering wheel according to claim 3, wherein said rim is integrally formed with said hub and said spoke assembly.

5. A steering wheel according to claim 4, wherein said supporting means is connected to the lower portion of said spoke.

6. A steering wheel according to claim 2, wherein said supporting means is connected to a spoke connecting said rim and said hub to each other.

7. A steering wheel for a vehicle, comprising:

a ring shaped rim;

a hub connected to a steering shaft;

a spoke connecting said rim and said hub to each other; and a supporting means which is formed independently of said rim, said hub, and said spoke that is connectable to said rim for supporting the rim and which transmits a load applied to said rim to said hub for providing a desired rigidity to said rim such that the rim deforms when a load of a predetermined value indicative of an accident condition is applied to said steering wheel.

8. A steering wheel according to claim 7, wherein said rim, said hub, and said spoke are integrally formed by casting, and said deformable portion is formed by press forming.

9. A steering wheel according to claim 8, wherein said supporting means is connected to a lower portion of said spoke.

10. A steering wheel according to claim 7, wherein said supporting means includes a deformable portion provided at a bracket of an air bag apparatus which is disposed inwardly of said rim and which inflates a bag body toward said vehicle occupant side by detecting a predetermined acceleration value.

11. A steering wheel according to claim 7, wherein said supporting means is structured so as to transmit said load to said hub via said spoke.

12. A steering wheel which has a ring shaped rim and is connected to a steering shaft of a vehicle via a hub, wherein supporting means is formed independently of said rim and said hub, is connected to said rim so as to support said rim from the inside, supports an air bag apparatus at said steering wheel, forms a spoke, and is deformable when a load of a predetermined value or more acts on said supporting means from the vehicle occupant side of said vehicle.

13. A steering wheel according to claim 1, further comprising means for directly connecting said supporting means onto said integrally formed spoke and hub assembly without any intermediate components between said supporting means and said spoke and hub assembly.

14. A steering wheel according to claim 7, further comprising a connecting means for directly connecting said supporting means to said ring shaped rim without any intermediate components between said supporting means and said ring shaped rim.

15. A steering wheel according to claim 12, further comprising a connecting means for directly connecting said supporting means to said ring shaped rim without any intermediate components between said supporting means and said ring shaped rim.

* * * * *